(12) United States Patent
Yustus

(10) Patent No.: US 9,062,824 B2
(45) Date of Patent: Jun. 23, 2015

(54) HEAD ASSEMBLY FOR JACKING TOWER

(71) Applicant: Konecranes Plc, Hyvinkää (FI)

(72) Inventor: Joe Yustus, Hartford, WI (US)

(73) Assignee: Konecranes Plc, Hyvinkää (FI)

( * ) Notice: Subject to any disclaimer, the term of this patent is extended or adjusted under 35 U.S.C. 154(b) by 179 days.

(21) Appl. No.: 13/797,877

(22) Filed: Mar. 12, 2013

(65) Prior Publication Data

US 2014/0259984 A1   Sep. 18, 2014

(51) Int. Cl.
| | |
|---|---|
| *F16M 11/18* | (2006.01) |
| *E04H 12/18* | (2006.01) |
| *B66C 23/28* | (2006.01) |
| *B66F 3/36* | (2006.01) |

(52) U.S. Cl.
CPC .............. *F16M 11/18* (2013.01); *E04H 12/182* (2013.01); *B66C 23/283* (2013.01); *B66F 3/36* (2013.01)

(58) Field of Classification Search
CPC ........ B66C 23/84; B66C 23/283; B66C 23/34
USPC .......................................... 254/101, 334, 338
See application file for complete search history.

(56) References Cited

U.S. PATENT DOCUMENTS

| | | | |
|---|---|---|---|
| 870,922 A | 11/1907 | Allen, Jr. | |
| 1,865,762 A | 7/1932 | Kaltenbach | |
| 2,858,945 A | 11/1958 | Pingon | |
| 2,924,428 A | 2/1960 | Whittall et al. | |
| 3,193,109 A | 7/1965 | Kerridge | |
| 3,194,412 A | 7/1965 | Kerridge | |
| 3,934,729 A | 1/1976 | Wellman | |
| 3,938,670 A | 2/1976 | Wellman | |
| 3,939,988 A | 2/1976 | Wellman | |
| 4,392,574 A | 7/1983 | Theyskens | |
| 4,573,593 A | 3/1986 | Lietzau | |
| 4,867,321 A | 9/1989 | Montgon | |
| 6,102,220 A | 8/2000 | Becker | |
| 6,475,058 B2 * | 11/2002 | Mammano et al. | ........... 446/426 |
| 7,350,650 B2 | 4/2008 | Wilson | |
| 7,424,998 B1 * | 9/2008 | Barney | .......................... 254/334 |
| 7,849,762 B2 * | 12/2010 | Viola | ......................... 74/490.08 |

(Continued)

FOREIGN PATENT DOCUMENTS

| | | |
|---|---|---|
| WO | 2009029879 | 3/2009 |
| WO | 2012162617 | 11/2012 |

OTHER PUBLICATIONS

PCT/IB2014/000292 International Search Report and Written Opinion dated Jun. 20, 2014 (7 pages).

*Primary Examiner* — Monica Carter
*Assistant Examiner* — Lauren Beronja
(74) *Attorney, Agent, or Firm* — Michael Best & Friedrich LLP

(57) ABSTRACT

A head assembly includes a first portion including a first member and a first motor coupled to the first component, the first member configured to rotate about a first axis of rotation. The head assembly also includes a second portion including a second member and a second motor coupled to the second component, the second member configured to rotate about a second axis of rotation, the second axis of rotation being different than the first axis of rotation. The head assembly also includes a third portion including a clamping assembly.

20 Claims, 13 Drawing Sheets

(56) References Cited

U.S. PATENT DOCUMENTS

| | | |
|---|---|---|
| 7,891,508 B2 | 2/2011 | Delago |
| 8,074,816 B2 | 12/2011 | Philippon |
| 8,235,230 B2 * | 8/2012 | Juraszek ........................ 212/278 |
| 8,550,438 B2 * | 10/2013 | Cilliers ........................ 254/342 |
| 2010/0006530 A1 | 1/2010 | Juraszek |
| 2013/0121801 A1 * | 5/2013 | Gipson ........................ 414/800 |

* cited by examiner

HEAD ASSEMBLY FOR JACKING TOWER

FIELD OF THE INVENTION

The present invention relates to a head assembly, and more particularly to a head assembly for a jacking tower.

BACKGROUND OF THE INVENTION

Head assemblies for large-scale towers are used in the construction industry. The head assemblies are located atop the towers. Booms or other structures are typically attached to the head assemblies.

SUMMARY

In accordance with one construction, a head assembly includes a first portion including a first member and a first motor coupled to the first member, the first member configured to rotate about a first axis of rotation. The head assembly also includes a second portion including a second member and a second motor coupled to the second member, the second member configured to rotate about a second axis of rotation, the second axis of rotation being different than the first axis of rotation. The head assembly also includes a third portion including a clamping assembly.

In accordance with another construction, a jacking tower includes a plurality of stacked modules, the stacked modules including a top module. The jacking tower also includes a head assembly coupled to the top module, the head assembly including a first member having a first degree of freedom, a second member having a second degree of freedom, and a third member having a third degree of freedom, where each of the first, second, and third degrees of freedom are different from each other.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
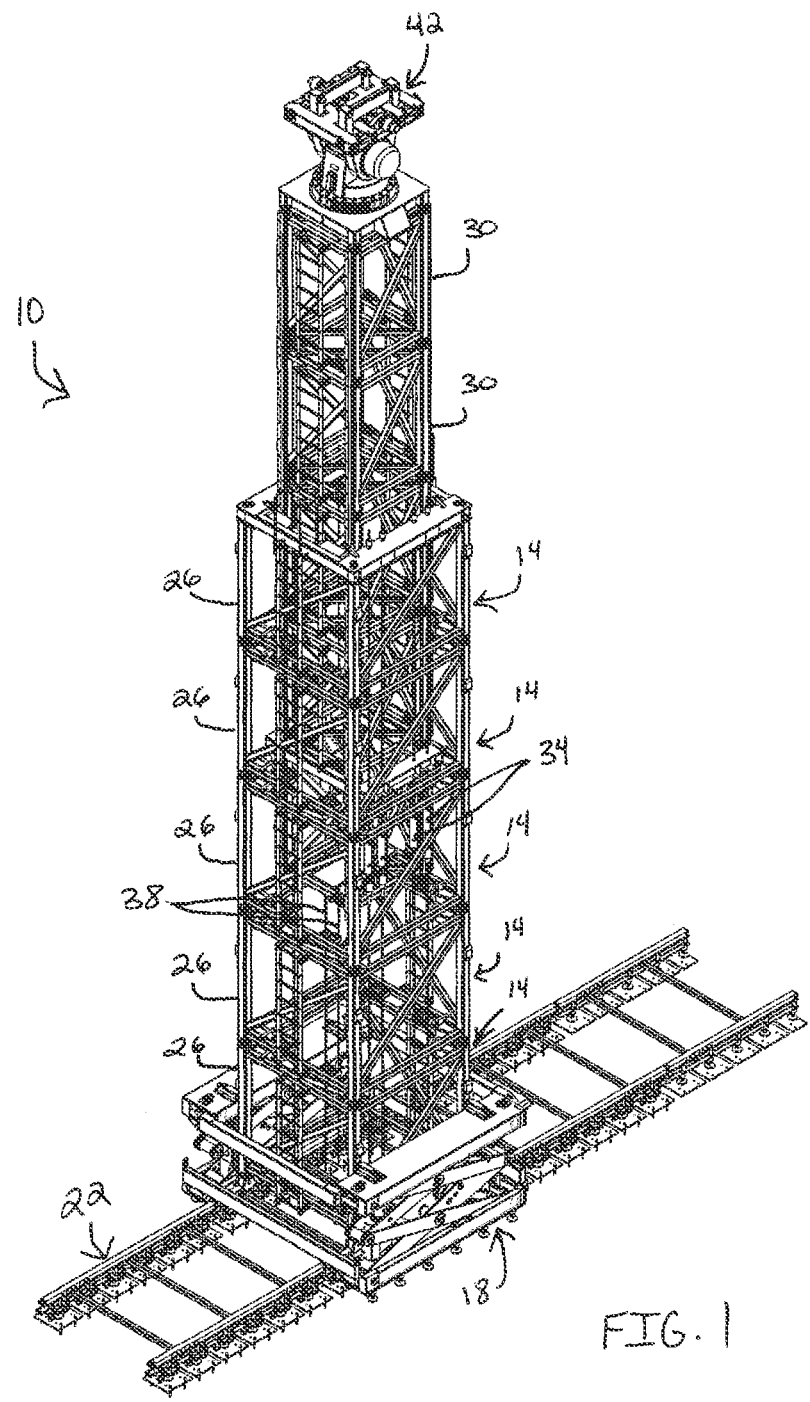
FIG. 1 is a perspective view of a fully assembled self-erecting jacking tower according to one construction of the invention, including a head assembly.
Figure 2:
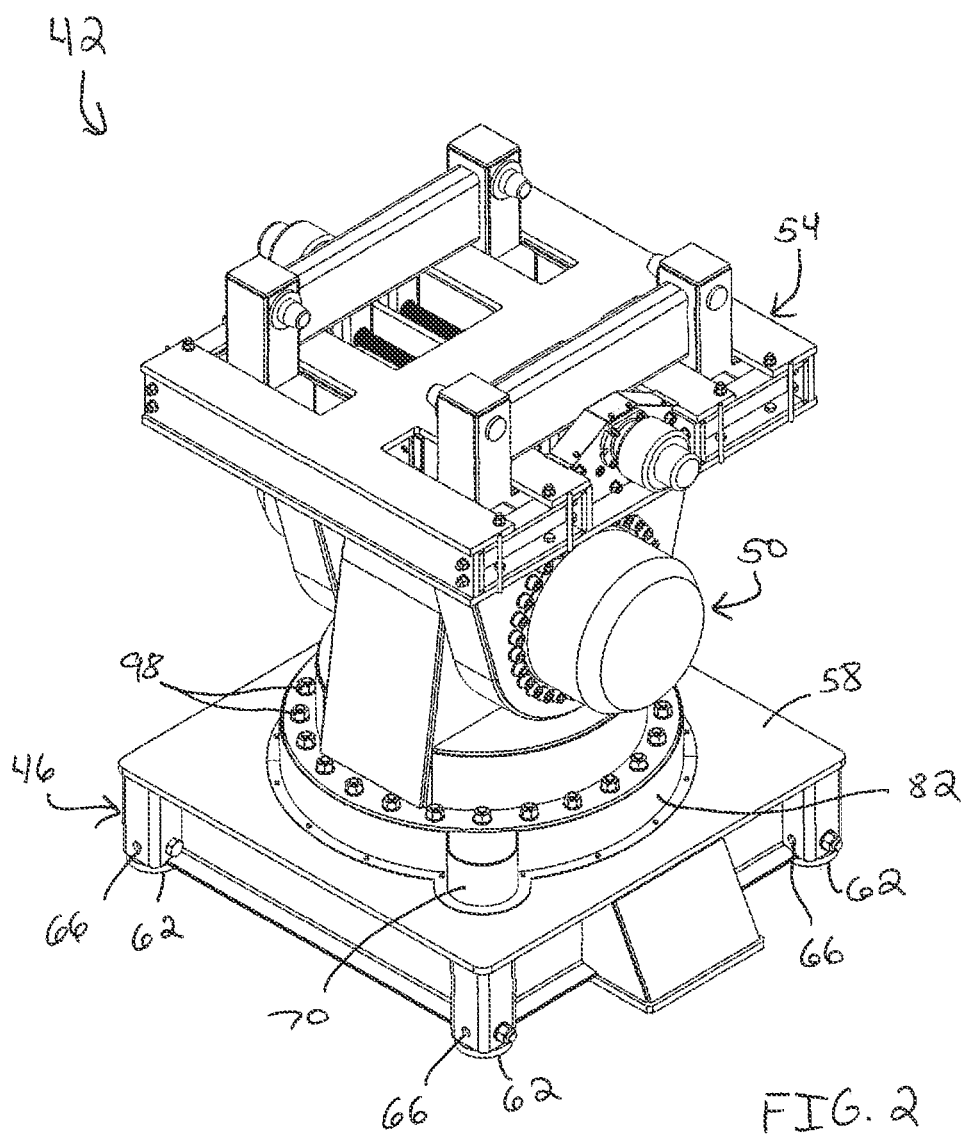
FIG. 2 is a top perspective view of the head assembly of FIG. 1.

FIG. 1 illustrates a fully assembled self-erecting jacking tower 10. Among other uses, the jacking tower 10 is used to install overhead cranes in industrial commercial, and nuclear power plants.

With reference to FIGS. 1-13 the jacking tower 10 includes stacked module assemblies 14 that are raised and assembled with a scissors lift assembly 18 along a rail assembly 22. The module assemblies 14 include outer frames 26 and inner frames 30, the inner frames 30 being movable relative the outer frames 26 via strand jacks 34 and cables 38. The jacking tower 10 also includes a head assembly 42 positioned on top of and coupled to the stacked module assemblies 14. The head assembly 42 is coupled to an inner frame 30 of a top module assembly 14. The head assembly 42 includes various degrees of freedom, and is used to grab, restrain, and/or move various components, including, but not limited, to a tower jib crane assembly, hanging platform, etc.

With reference to FIGS. 2-13, the head assembly 42 includes a bottom portion 46, a middle portion 50, and a top portion 54. The bottom portion is coupled to the middle portion 50, and the middle portion 50 is coupled to the top portion 54.

Figure 3:
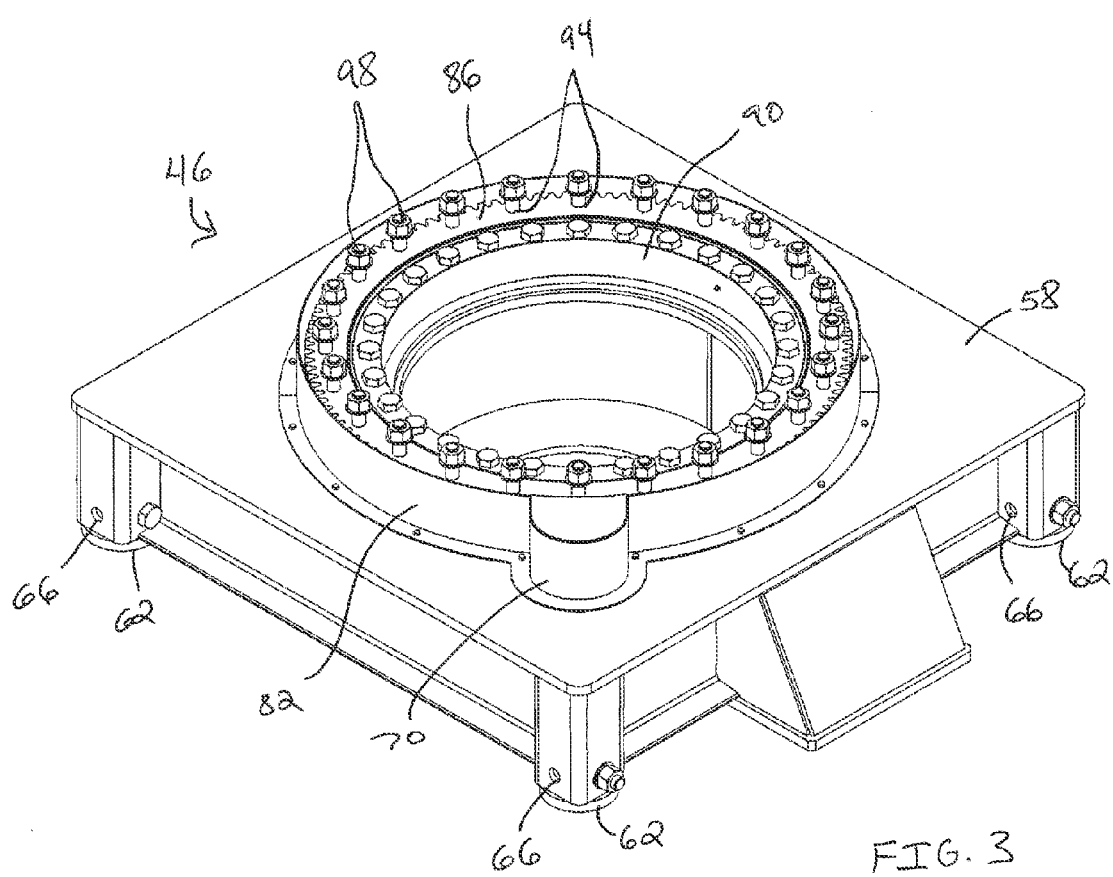
FIG. 3 is a top perspective view of a bottom portion of the head assembly of FIG. 1.
Figure 4:
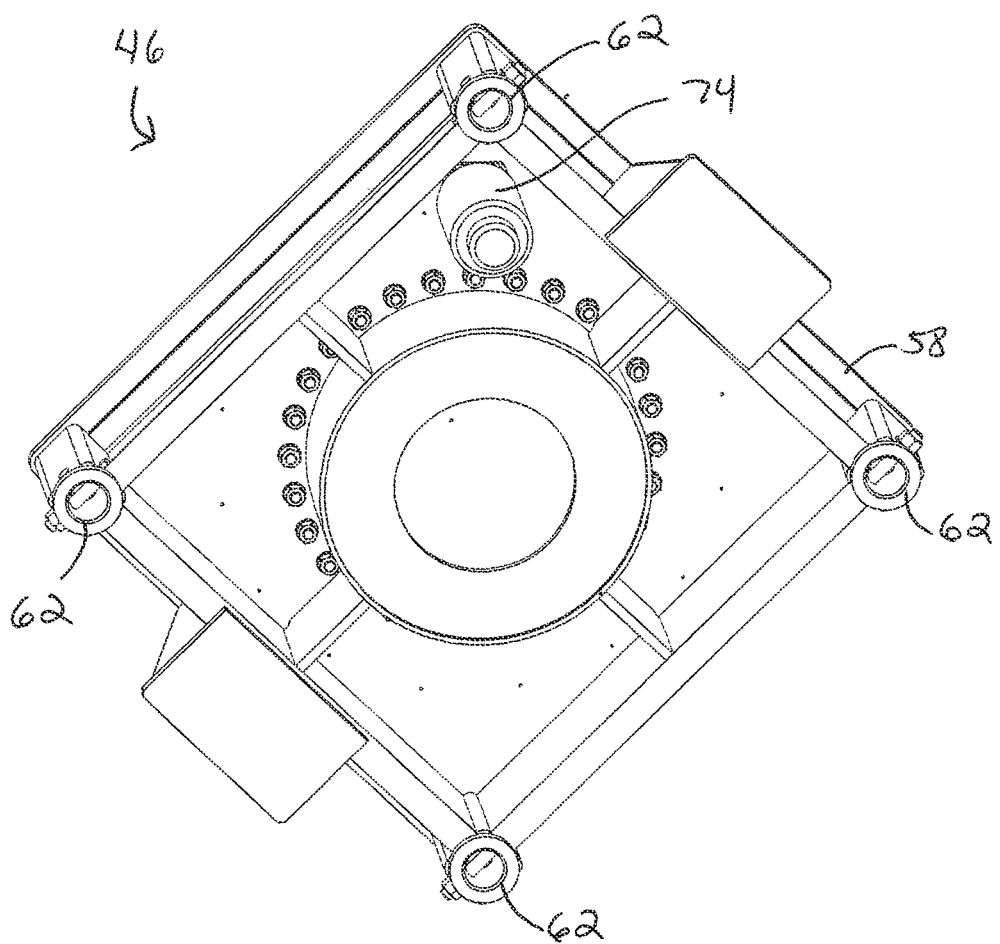
FIG. 4 is a bottom perspective view of the bottom portion of FIG. 3

With reference to FIGS. 3-6, the bottom portion 46 includes a housing 58. The housing 58 has a generally rectangular configuration, although other constructions include different configurations and sizes. As illustrated in FIGS. 3 and 4, the housing 58 includes four female mating components 62. The female mating components 62 are in the form of tapered sockets with apertures 66, although other forms are also possible. The female mating components 62 are positioned along bottom corners of the housing 58. The female mating components 62 are configured to slide over corresponding male mating components on one of the inner frames 30, with bolts passing through the apertures 66 to further couple the head assembly 42 to the inner frame 30. While four female mating components 62 are illustrated, other constructions include different numbers of female mating components 62. Additionally, in some constructions male mating components are used in place of the female mating components 62, the male mating components configured to mate with corresponding female mating components on the inner frame 30.

Figure 5:
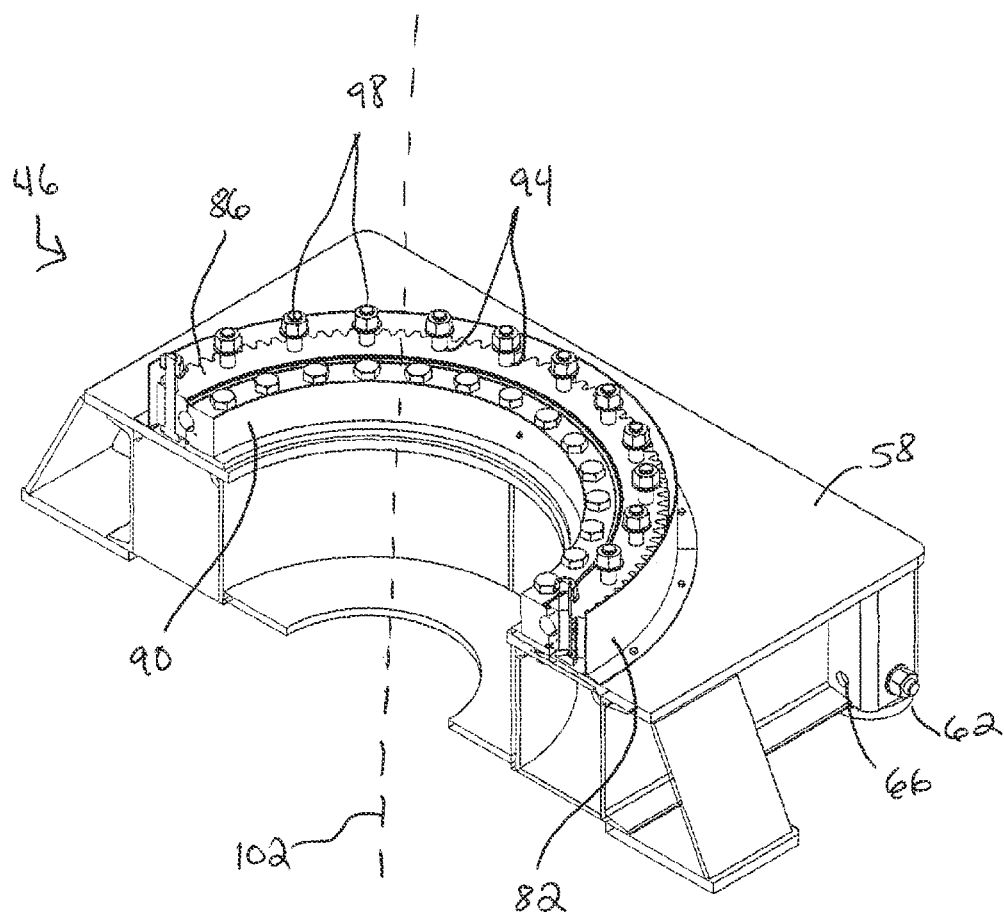
FIG. 5 is a cross-sectional, top perspective view of the bottom portion of FIG. 3.
Figure 6:
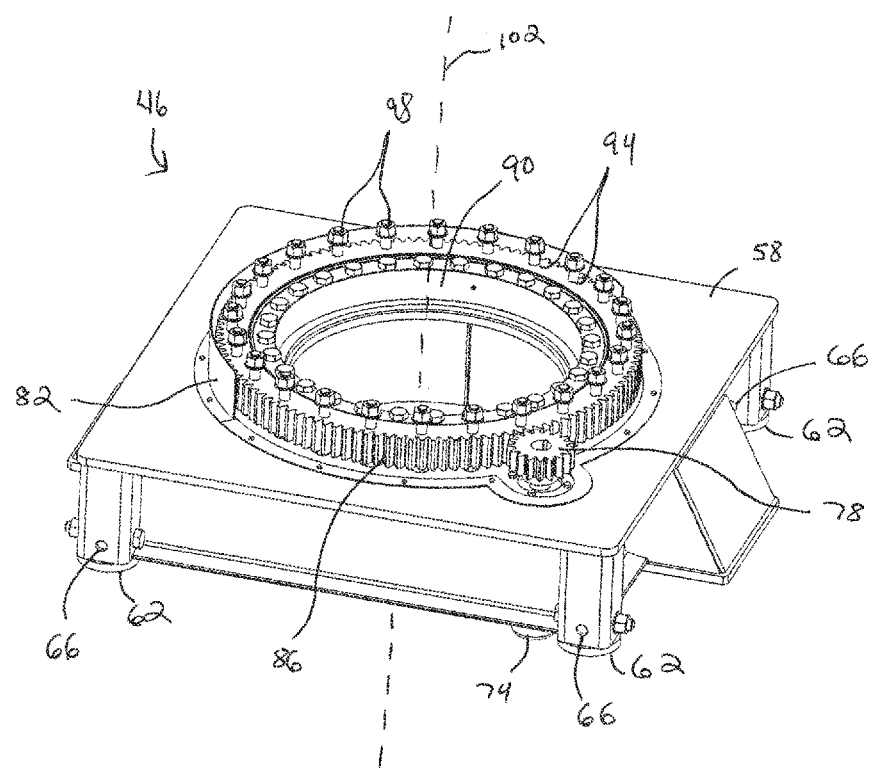
FIG. 6 is a top perspective view of the bottom portion of FIG. 3, with a section of a housing removed, illustrating a ring gear and a motor drive gear.

With continued reference to FIGS. 3-6, the housing 58 further includes a motor housing 70. The motor housing 70 covers a portion of a motor 74 located underneath the housing 58. The motor 74 is a hydraulically operated motor, though other constructions include other types of motors. With reference to FIG. 6, the motor 74 includes an output or drive gear 78.

The housing 58 further includes a ring gear housing 82. The ring gear housing 82 covers a portion of a ring gear 86 located within the ring gear housing 82. As illustrated in FIG. 5, the ring gear 86 sits between the ring gear housing 82 and an inner housing 90. As illustrated in FIG. 6, the ring gear 86 is engaged with the drive gear 78 of the motor. The ring gear 86 includes apertures 94 for receiving bolts 98 for coupling the bottom portion 46 to the middle portion (discussed in further detail below). As illustrated in FIGS. 5 and 6, the ring gear 86 is configured to rotate 360 degrees about a first axis 102 via rotation of the drive gear 78, though in other constructions the ring gear 86 has different degrees of rotational freedom.

Figure 7:
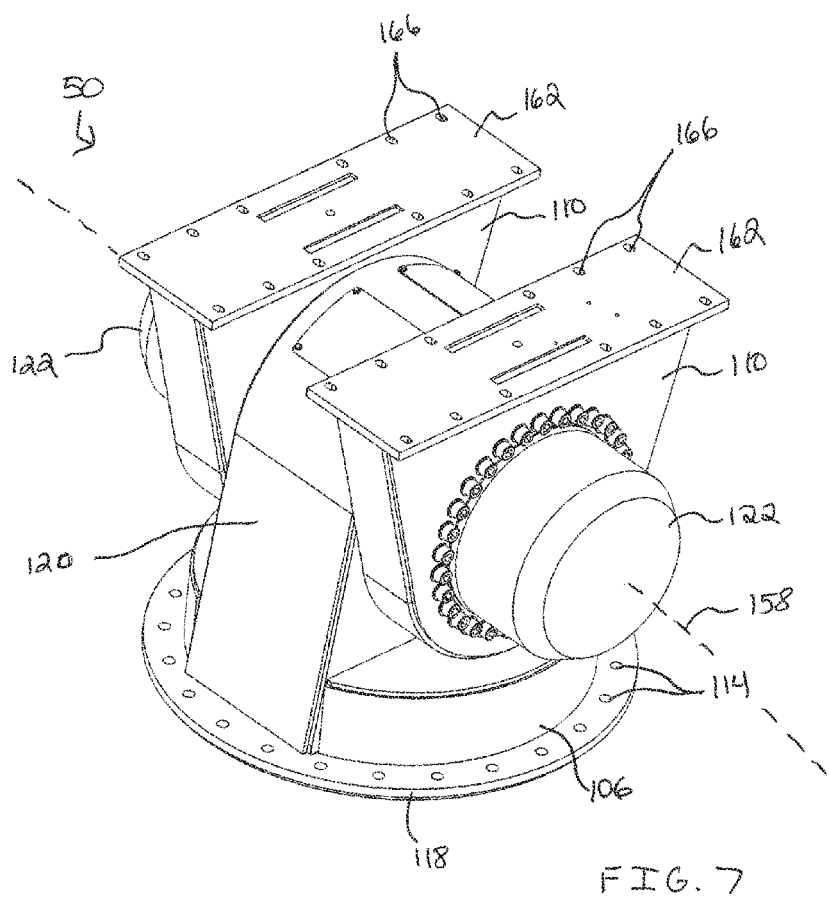
FIG. 7 is a top perspective view of a middle portion of the head assembly of FIG. 1, including a first rotatable member and a second rotatable member.
Figure 8:
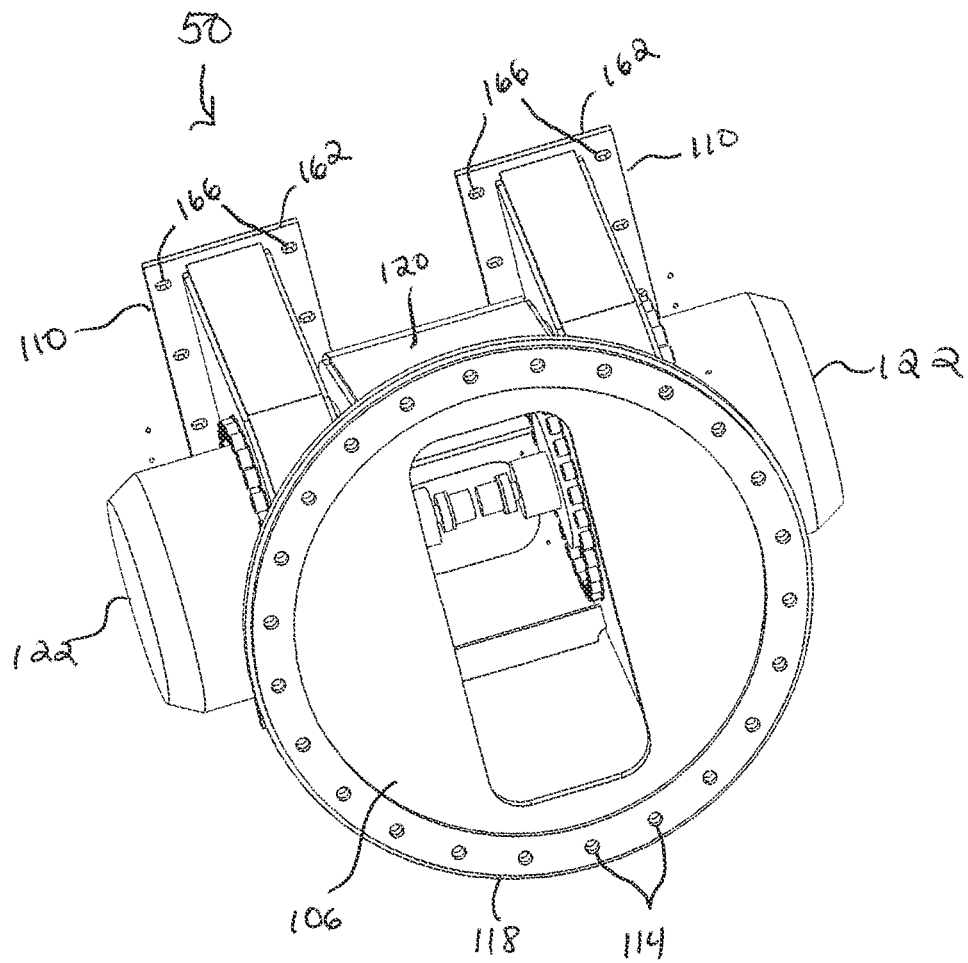
FIG. 8 is a bottom perspective view of the middle portion of FIG. 7.

With reference to FIGS. 7-10, the middle portion 50 includes a first member 106 and two second members 110. Referring to FIGS. 7 and 8, the first member 106 includes apertures 114 spaced circumferentially around a flange 118 extending outwardly from the first member 106. The bolts 98 of the bottom portion 46 are configured to pass through the apertures 114 in order to couple the middle portion 50 to the bottom portion 46. Once coupled to the bottom portion 46, the middle portion 50 is rotatable about the first axis 102. The first member 106 also includes an arched housing 120. The housing 120 extends between the second members 110.

Figure 9:
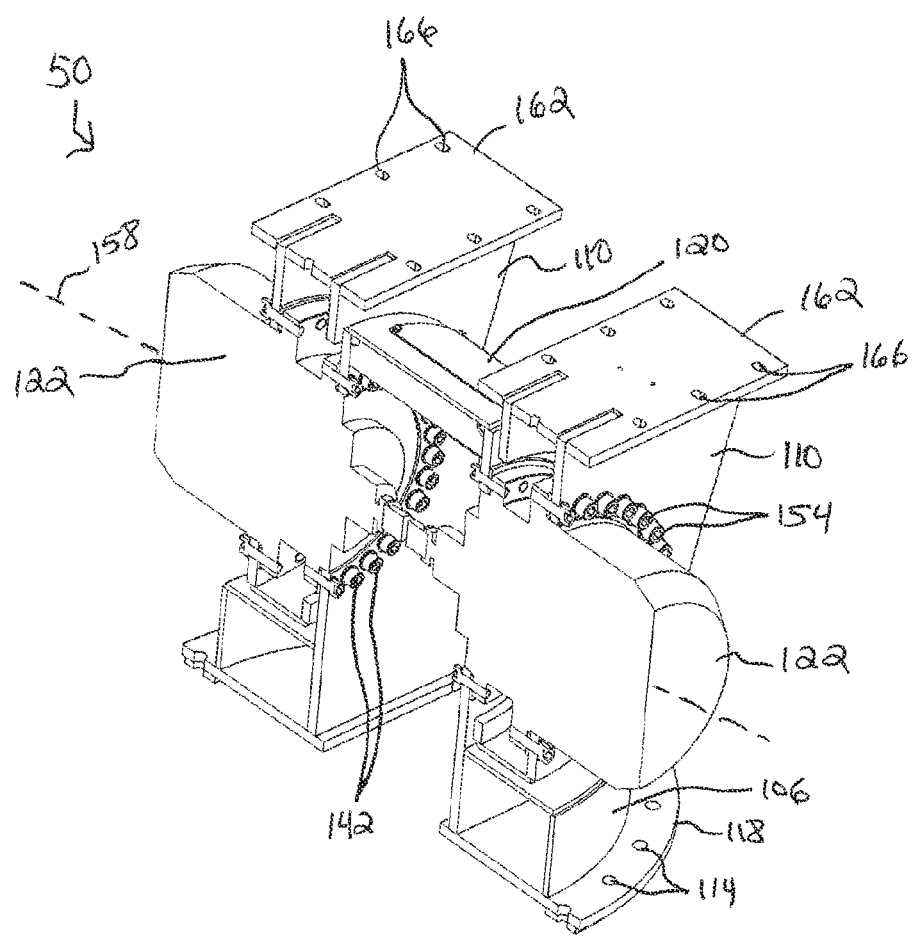
FIG. 9 is a cross-sectional, top perspective view of the middle portion of FIG. 7, illustrating two motor assemblies.
Figure 10:
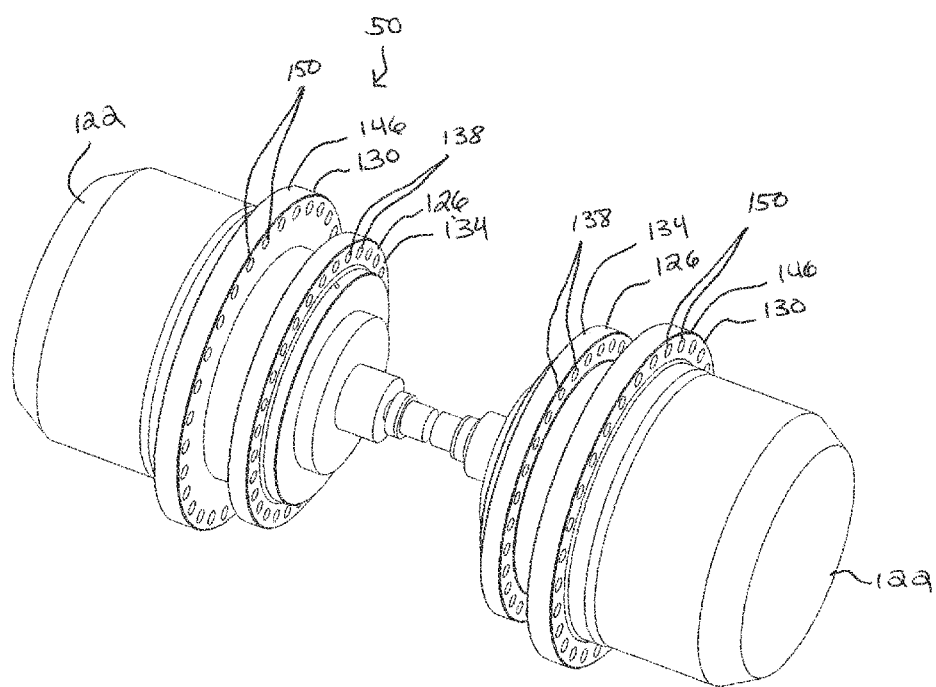
FIG. 10 is a top perspective view of the two motor assemblies of FIG. 9.

With reference to FIGS. 9 and 10, the middle portion 50 includes two motors 122. The motors 122 are hydraulically operated drive motors, though other constructions use different types of motors. As illustrated in FIG. 10, the motors 122 each include a non-rotating portion 126 and a rotating portion 130. The rotating portions 130 are rotatable relative to the non-rotating portions 126. Each of the non-rotating portions 126 includes a flange 134 with apertures 138. As illustrated in FIG. 9, bolts 142 are passed through the apertures 138 to couple the non-rotating portions 126 to the housing 122 of the first member 106. Each of the rotating portions 130 includes a flange 146 with apertures 150. As illustrated in FIG. 9, bolts 154 are passed through the apertures 150 to couple the rotating portions 130 to the second members 110.

The second members 110 are separate from the first member 106, and are not rigidly attached to the first member 106. The motors 122 rotate the rotating portions 130, causing rotation of the second members 110 relative to the first member 106, and thereby the bottom portion 46 of the head assembly 42. In particular, and as illustrated in FIGS. 7 and 9, the motors 122 rotate the second members 110 about a second axis 158, which is substantially perpendicular to the first axis 102 in the illustrated construction. The motors 122 rotate the second members 110 approximately 60 degrees past vertical in either direction, though other constructions permit different ranges of rotational freedom. Additionally, in other constructions the middle portion 50 includes only a single motor 122 that rotates one or more second members 110 relative to the first member 106.

With continued reference to FIGS. 7-10, each of the second members 110 includes a flange portion 162. The flange portions 162 are generally rectangular, and flat, and include apertures 166 for coupling the top portion 54 of the head assembly 42 to the middle portion 50.

Figure 11:
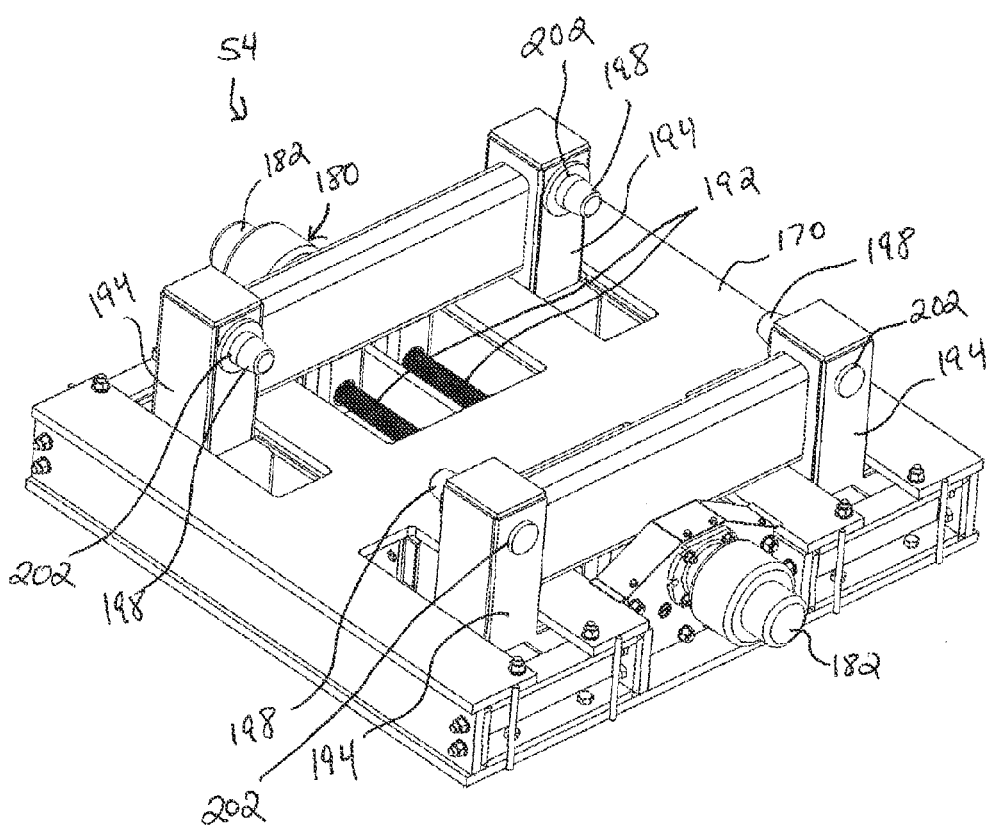
FIG. 11 is a top perspective view of a top portion of the head assembly of FIG. 1.
Figure 12:
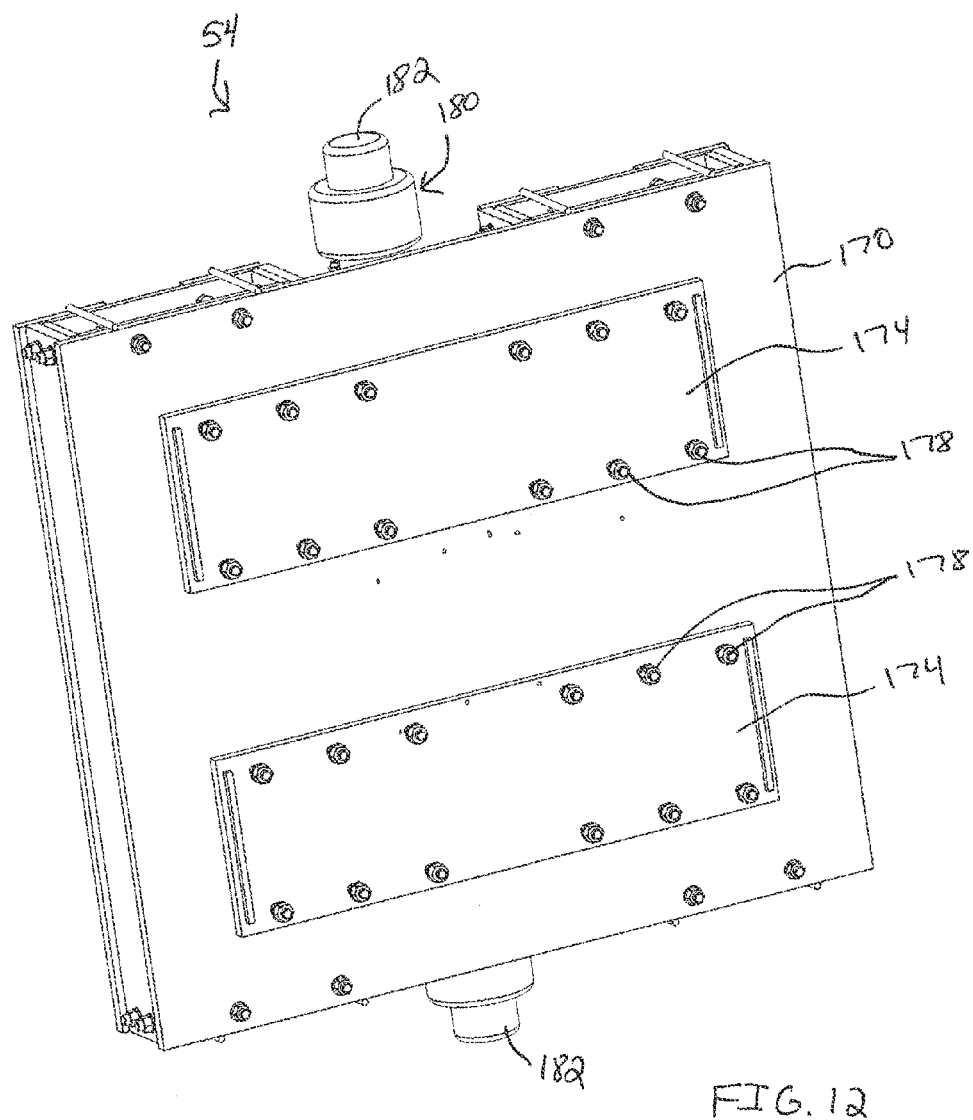
FIG. 12 is a bottom perspective view of the top portion of FIG. 11.
Figure 13:
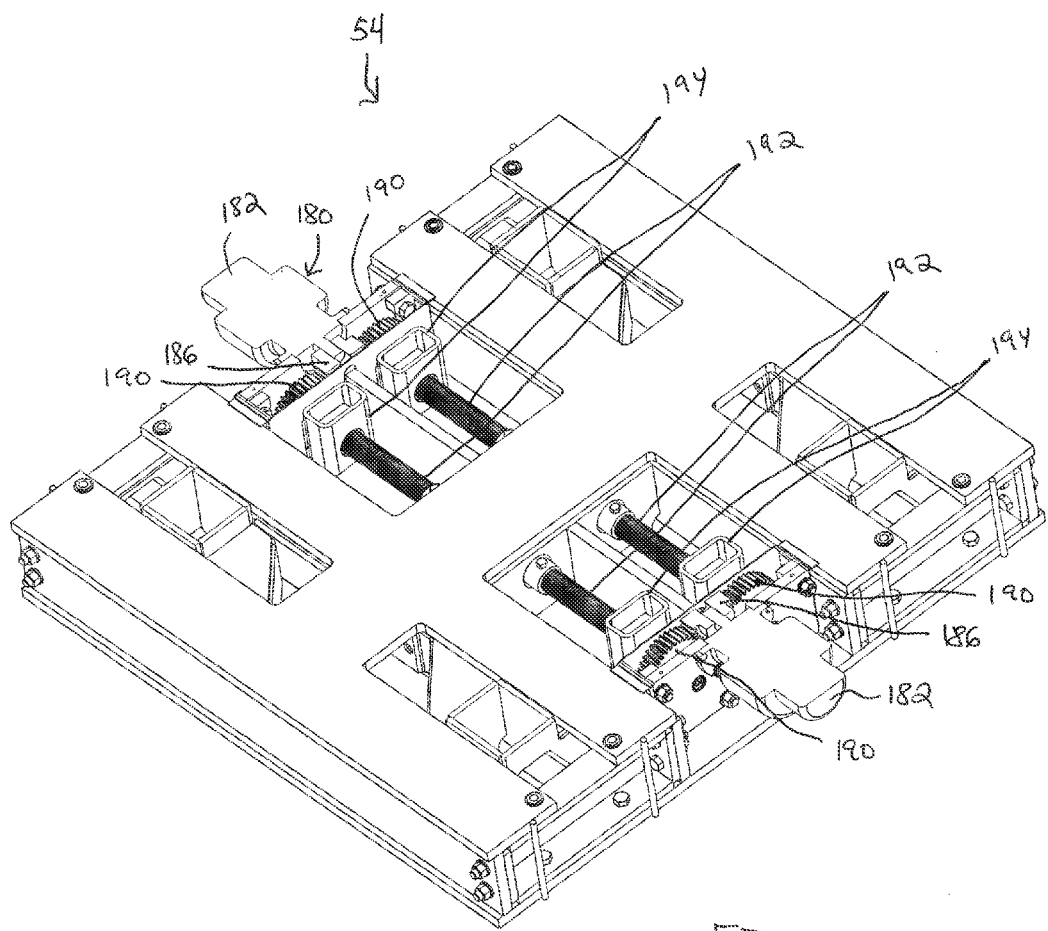
FIG. 13 is a cross-sectional, top perspective view of the top portion of FIG. 11, illustrating two jack screw motor assemblies.

With reference to FIGS. 11-13, the top portion 54 includes a housing 170. The housing 170 is generally rectangular in shape, though other constructions include different shapes and sizes for the housing 170. As illustrated in FIG. 12, the housing 170 includes raised portions 174 along a bottom of the housing 170. The raised portions 174 are generally rectangular, and flat. In the illustrated construction, the raised portions 174 are the same size as the flange portions 162. Bolts 178 pass through the apertures 166 on the flange portions 162 and into the raised portions 174 to couple the middle portion 50 to the top portion 54.

The top portion 54 also includes a clamping assembly 180, which in the illustrated construction includes two motors 182, with an output or drive gear 186 associated with each motor 182. The clamping assembly 180 also includes a pair of clamp gears 190 coupled to each of the motors 182 via the respective drive gear 186. The clamping assembly 180 also a jack screw 192 coupled to each of the clamp gears 190, which thereby rotate the corresponding jack screw 192. A clamp member 194 is coupled to each jack screw 192, and moves along the corresponding jack screw 192 as the screw is rotated.

As illustrated in FIG. 13, the motors 182 turn the drive gears 186, and rotation of the drive gear 186 causes rotation of the respective clamp gears 190, thereby causing rotation of the jack screws 192. Because the clamp members 194 are constrained from rotation, rotation of the jack screws 192 causes linear movement of the clamp members 194 along the jack screws 192. The linear movement of the clamp members 194 causes the clamp members 194 on one side of the top portion 54 to either move closer toward the other two clamp members 194 on the other side of the top portion 54, or to move farther away from the clamp members 194 on the other side of the top portion 54, depending upon a direction of rotation of the drive gears 186.

As illustrated in FIG. 11, the clamping assembly 180 also includes retaining pins 198, which are coupled to the clamping members 194. The retaining pins 198 are slidable within apertures 202 formed in the clamping members 194. The retaining pins 198 are used to engage additional components, including but not limited to a tower jib crane assembly, hanging platform, etc.

For example, in operation a component is lifted and/or moved close to the head assembly 42. The motors 74, 122 are then used to adjust a position and orientation of the top portion 54, until the top portion 54 is aligned with the component. In particular, the motor 74 is used to rotate the ring gear 86 about the first axis 102, which thereby causes rotational movement of the middle portion 50 and coupled top portion 54 (including clamping assembly 180) about the first axis 102. The motor 122 is then used to rotate the second members 110 about the second axis 158, which thereby causes rotational movement of the coupled top portion 54 about the second axis 158. These rotational movements are made to align the top portion 54 and clamping assembly 180 with the component.

With the top portion 54 aligned with the component, the clamping assembly 180 is then used to grasp the component. In particular, the motors 182 are used to close the clamp members 194 (i.e., move the clamp members 194 closer together) about the component to grasp the component. The retaining pins 198 are then moved into engagement with the component (e.g., through apertures on the component), so as to restrain movement of the component. The motors 74, 122 are then used to move the head assembly 42 if desired, so as to reorient the component.

In some constructions, and with reference to FIG. 1, a separate crane is used to deliver a component close to the head assembly 42. The head assembly 42 is positioned, using motors 74, 122, to grasp the component. The component is grasped by the pins 198 of the head assembly 42, and then redirected using the motors 74, 122 to a different position and orientation, where the component is then attached to a separate, second component adjacent the jacking tower 10.

In some constructions, with continued reference to FIG. 1, a component is grasped by the head assembly 42 prior to top module 14 being raised up with the strand jacks 34. Once the head assembly 42 reaches the position shown in FIG. 1, the head assembly then uses motors 74, 122 to orient the component, and when the component is ready to be released, the retaining pins 198 are removed, and the clamp members 194 are drawn apart by the motors 182.

Although the invention has been described in detail with reference to certain preferred embodiments, variations and modifications exist within the scope and spirit of one or more independent aspects of the invention as described.

What is claimed is:

1. A jacking tower comprising:
   a plurality of stacked modules stacked along a first axis, the stacked modules including a top module; and
   a head assembly coupled to the top module, the head assembly including a bottom portion coupled to the top module, a first member movably coupled to the bottom portion and having a first rotational degree of freedom relative to the bottom portion about the first axis, a second member movably coupled to the first member and having a second rotational degree of freedom relative to the first member about a second axis, the second axis substantially perpendicular to the first axis, and a third member movably coupled to the second member and having a third, linear degree of freedom relative to the second member.

2. The jacking tower of claim 1, wherein the head assembly includes a clamping assembly, and wherein the third member includes a clamping member of the clamping assembly.

3. The jacking tower of claim 2, wherein the clamping assembly includes jack screws, a clamp member coupled to each jack screw, and a clamp gear coupled to each jack screw.

4. The jacking tower of claim 1, wherein a first motor is coupled to the first member, a second motor is coupled to the second member, and a third motor is coupled to the third member.

5. The jacking tower of claim 1, wherein the second member is rotatable 360 degrees about the first axis.

6. The jacking tower of claim 5, wherein the third member is rotatable less than 360 degrees about the second axis.

7. The jacking tower of claim 2, wherein the clamping assembly includes two clamp members that are movable linearly toward and away from one another.

8. The jacking tower of claim 7, wherein the two clamp members are movable along an axis parallel to the second axis.

9. The jacking tower of claim 7, wherein the clamping assembly includes retaining pins extending from the two clamp members.

10. The jacking tower of claim 3, wherein the clamping assembly includes motors that rotate the clamp gears to cause the clamp members to move linearly along the jack screws.

11. The jacking tower of claim 1, wherein the bottom portion includes a motor and a ring gear driven by the motor, wherein the first member is coupled to the ring gear.

12. The jacking tower of claim 1, wherein the first member includes two motors that rotate the second member relative to the first member about the second axis.

13. The jacking tower of claim 1, wherein the first member includes a first housing, and wherein the second member includes a second housing, and wherein a central portion of the first housing extends between opposing end portions of the second housing.

14. The jacking tower of claim 13, wherein the second housing includes two top flanges, and wherein a third, rectangular housing is coupled to the two top flanges.

15. The jacking tower of claim 14, wherein the third member is coupled to the third, rectangular housing.

16. The jacking tower of claim 1, wherein the second member is coupled to the first member such that both the first member and the second member are rotatable about the first axis.

17. The jacking tower of claim 1, wherein the third member is coupled to the first member such that both the first member and the third member are rotatable about the first axis.

18. The jacking tower of claim 1, wherein the third member is coupled to the second member such that both the second member and the third member are rotatable about the second axis.

19. The jacking tower of claim 1, wherein the first member is coupled directly to the bottom portion, the second member is coupled directly to the first member, and the third member is coupled directly to the second member.

20. The jacking tower of claim 1, wherein each of the stacked modules includes an outer frame and an inner frame.

* * * * *